United States Patent
Jones et al.

(10) Patent No.: US 6,941,430 B2
(45) Date of Patent: Sep. 6, 2005

(54) MIRRORED DISK PARTITION WITH DISK PARTITION MODIFICATION CONTEMPORANEOUS WITH CLIENT APPLICATION ACCESS

(75) Inventors: Jerry Jones, Naperville, IL (US); Man K. Kwong, Naperville, IL (US); Ming Yong Ng, Bolingbrook, IL (US); Lai-Cherng Suen, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 281 days.

(21) Appl. No.: 10/369,049

(22) Filed: Feb. 18, 2003

(65) Prior Publication Data
US 2004/0162955 A1 Aug. 19, 2004

(51) Int. Cl.[7] .............................................. G06F 12/00
(52) U.S. Cl. .................... 711/162; 711/161; 707/204
(58) Field of Search ............................. 711/161–162; 707/204; 714/6–7; 713/2; 709/221

(56) References Cited

U.S. PATENT DOCUMENTS

| | | | |
|---|---|---|---|
| 6,195,695 B1 * | 2/2001 | Cheston et al. ............ | 709/221 |
| 6,269,431 B1 * | 7/2001 | Dunham ...................... | 711/162 |
| 6,560,701 B1 * | 5/2003 | Berstis et al. ................ | 713/2 |
| 6,757,841 B1 * | 6/2004 | Gitlin et al. .................. | 714/7 |
| 2004/0083357 A1 * | 4/2004 | Duncan et al. ............... | 713/2 |
| 2004/0153724 A1 * | 8/2004 | Nicholson et al. .......... | 714/6 |

OTHER PUBLICATIONS

"Metadevice"; http://docs.sun.com/db/doc/802–7073/6ianhssi4?a=view; Network Glossary: M; Sun Microsystems, Inc., Corporate Office, 4150 Network Circle, Santa Clara, CA 95054; p. 1; USA; Feb. 12, 2003.

"Metadevice state database"; http://docs.sun.com/db/doc/802–7073/6ianhssi4?a=view; HA Cluster Glossary; Sun Microsystems, Inc., Corporate Office, 4150 Network Circle, Santa Clara, CA 95054; p. 1; USA; Feb. 12, 2003.

Mirroring; http://docs.sun.com/db/doc/802–7073/6ianhssi4?a=view; HA Cluster Glossary; Sun Microsystems, Inc., Corporate Office, 4150 Network Circle, Santa Clara, CA 95054; p. 1; USA; Feb. 12, 2003.

(Continued)

*Primary Examiner*—Nasser Moazzami

(57) ABSTRACT

A first content portion of a first disk partition is mirrored to a second content portion of a second disk partition. A first one of the first content portion and the second content portion that is modified contemporaneously with access by one or more client applications to one or more subportions of a second one of the first content portion and the second content portion.

19 Claims, 6 Drawing Sheets

OTHER PUBLICATIONS

Stripe; http://docs.sun.com/db/doc/802–7073/6ianhssi4?a=view; HA Cluster Glossary; Sun Microsystems, Inc., Corporate Office, 4150 Network Circle, Santa Clara, CA 95054; p. 1; USA; Feb. 12, 2003.

Submirror, http://docs.sun.com/db/doc/802–7073/6ianhssi4?a=view; HA Cluster Glossary; Sun Microsystems, Inc., Corporate Office, 4150 Network Circle, Santa Clara, CA 95054; p. 1; USA; Feb. 12, 2003.

Metadevice; http://docs.sun.com/db/doc/806–3204/6Jccb3gap?a=view; Solstice DiskSuite 4.2.1 Reference Guide; Sun Microsystems, Inc., Corporate Office, 4150 Network Circle, Santa Clara, CA 95054; p. 1; USA; Feb. 12, 2003.

Metadevice Editor window; http://docs.sun.com/db/doc/806–3204/6Jccb3gap?a=view; Solstice DiskSuite 4.2.1 Reference Guide; Sun Microsystems, Inc., Corporate Office, 4150 Network Circle, Santa Clara, CA 95054; p. 1; USA; Feb. Feb. 12, 2003.

Metadevice state database; http://docs.sun.com/db/doc/806–3204/6Jccb3gap?a=view; Solstice DiskSuite 4.2.1 Reference Guide; Sun Microsystems, Inc., Corporate Office, 4150 Network Circle, Santa Clara, CA 95054; p. 1; USA; Feb. 12, 2003.

Metadisk driver, http://docs.sun.com/db/doc/806–3204/6Jccb3gap?a=view; Solstice DiskSuite 4.2.1 Reference Guide; Sun Microsystems, Inc., Corporate Office, 4150 Network Circle, Santa Clara, CA 95054; p. 1; USA; Feb. 12, 2003.

Mirror, http://docs.sun.com/db/doc/806–3204/6Jccb3gap?a=view; Solstice DiskSuite 4.2.1 Reference Guide; Sun Microsystems, Inc., Corporate Office, 4150 Network Circle, Santa Clara, CA 95054; p. 1; USA; Feb. 12, 2003.

Mirroring; http://docs.sun.com/db/doc/806–3204/6Jccb3gap?a=view; Solstice DiskSuite 4.2.1 Reference Guide; Sun Microsystems, Inc., Corporate Office, 4150 Network Circle, Santa Clara, CA 95054; p. 1; USA; Feb. 12, 2003.

"Metadevice"; http://www.clock.org/~jss/glossary/m.html; Network Glossary: M, Cambridge, MA; (617) 868–6464; p. 1; USA; Feb. 12, 2003.

"Mirror"; http:www.clock.org/~jss/glossary/m.html; Network Glossary: M. Cambridge, MA; (617) 868–6464; p. 1; USA; Feb. 12, 2003.

"Stripe"; http://www.clock.org/~jss/glossary/m.html; Network Glossary: S, Cambridge, MA; (617) 868–6464; p. 1; USA; Feb. 12, 2003.

"Stripe width"; http://www.clock.org/~jss/glossary/m.html; Network Glossary: S, Cambridge, MA; (617) 868–6464; p. 1; USA; Feb. 12, 2003.

"Submirror"; http://www.clock.org/~jss/glossary/m.html; Network Glossary: S, Cambridge, MA; (617) 868–6464; p. 1; USA; Feb. 12, 2003.

* cited by examiner

MIRRORED DISK PARTITION WITH DISK PARTITION MODIFICATION CONTEMPORANEOUS WITH CLIENT APPLICATION ACCESS

TECHNICAL FIELD

The invention relates generally to server software and more particularly to updates of server software.

BACKGROUND

One approach to an update of software (e.g., an operating system update) on a server computer involves an update controller copying the operating system from a first disk partition to a second disk partition. The update controller stores a copy of the operating system in a second disk partition. The update controller shuts down the server computer and reboots the server computer a first time to run the copy of the operating system from the second disk partition. After the first reboot, the update controller updates the operating system in the first disk partition. Next, the update controller shuts down the server computer and causes a second reboot of the server computer. After the second reboot, the server computer runs the updated operating system from the first disk partition.

One shortcoming of the approach is that during the time between the first shutdown and the second reboot, the client application services are disabled and the server computer is down causing a service outage and interruption. The service outage and interruption is typically between forty-five minutes and one hour. During the service outage and interruption commercially profitable services of the server computer are inoperable. A further shortcoming is that at least two shutdown and reboot cycles are required to complete the operating system update.

Another approach to the operating system update on the server computer involves a Solaris™ operating system update tool offered by Sun Microsystems, Inc. (Santa Clara, Calif. 95054, http://www.sun.com) under the trade identifier LiveUpdate. LiveUpdate copies the Solaris™ operating system stored in the first disk partition to the second disk partition. Then, LiveUpdate updates the copy of the Solaris™ operating system in the second disk partition. After the operating system is updated, the server computer runs the updated operating system from the second disk partition.

A shortcoming of this approach is that after the operating system is updated, the server computer runs the operating system from a different disk partition than before the update. It is undesirable to run the operating system from a different disk partition than before the update in complex telecommunication server computers. Running the operating system from the different disk partition than before the update adds complications when client applications attempt to access the telecommunication server computers. Yet another shortcoming is that if the server computer employs metadevices (e.g., logical devices representing one or more physical slices) to couple a file system to the disk partition, then the LiveUpdate tool is unable to update the contents of the disk partition.

Thus, a need exists for promotion of a decrease in a length of service outage of a server computer upon an update of software of the server computer.

SUMMARY

The invention in one embodiment encompasses a method. A first content portion of a first disk partition is mirrored to a second content portion of a second disk partition. A first one of the first content portion and the second content portion is modified contemporaneously with access by one or more client applications to one or more subportions of a second one of the first content portion and the second content portion.

Another embodiment of the invention encompasses an apparatus. The apparatus comprises a first disk partition, a second disk partition, a first submirror, a second submirror, a primary file system, and a secondary file system. The first disk partition stores contents of the primary file system. The second disk partition is able to store the contents of the primary file system. The first submirror is associated with the first disk partition and a first metadevice. The first metadevice is associated with the primary file system. The second submirror is associated with the second disk partition and the second metadevice. The second metadevice is associated with the secondary file system. A detachment of the second submirror from the second metadevice and an attachment of the second submirror with the first metadevice serves to transfer a mirrored copy of the contents of the primary file system to the second disk partition. A detachment of the first submirror from the first metadevice and an attachment of the first submirror with the second metadevice serve to facilitate modification of the contents of the primary file system through the second metadevice contemporaneously with access to the contents of the primary file system through the first metadevice.

Yet another embodiment of the invention encompasses an article. The article comprises a computer-readable signal-bearing medium. The article includes means in the medium for mirroring a first content portion of a first disk partition to a second content portion of a second disk partition. The article includes means in the medium for modifying a first one of the first content portion and the second content portion contemporaneously with access to one or more subportions of a second one of the first content portion and the second content portion by one or more client applications.

DESCRIPTION OF THE DRAWINGS

Features of exemplary implementations of the invention will become apparent from the description, the claims, and the accompanying drawings in which:

DETAILED DESCRIPTION

Figure 1:
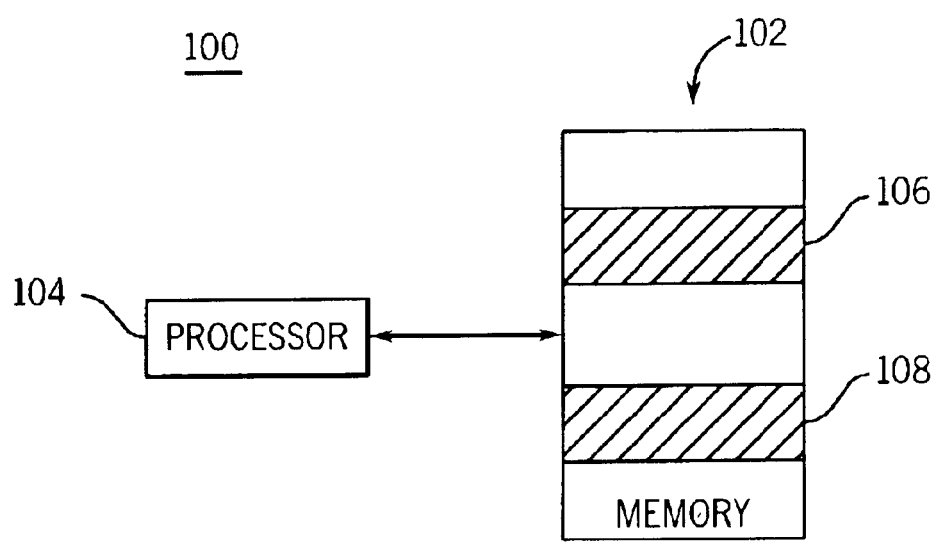
FIG. 1 is a representation of an exemplary implementation of an apparatus that comprises one or more recordable data storage media and a processor.

Turning to FIG. 1, an apparatus 100 in one example comprises a plurality of components such as computer software and/or hardware components. A number of such components can be combined or divided in the apparatus 100.

The apparatus 100 in one example comprises one or more recordable data storage media 102 and a processor 104. The recordable data storage medium 102 in one example comprises a first software component and a second software component, for example, a first operating system 106 and a second operating system 108, respectively. The first and second operating systems 106 and 108 reside on respective first and second partitions of the recordable data storage medium 102.

The second operating system 108 in one example comprises an updated version of the first operating system 106. In one example, the first operating system 106 and the second operating system 108 reside on different portions of the recordable data storage medium 102. In another example, the first operating system 106 and the second operating system 108 reside on distinct instances of the recordable data storage medium 102. The processor 104 in one example accesses and controls one or more portions of the recordable data storage medium 102.

Figure 2:
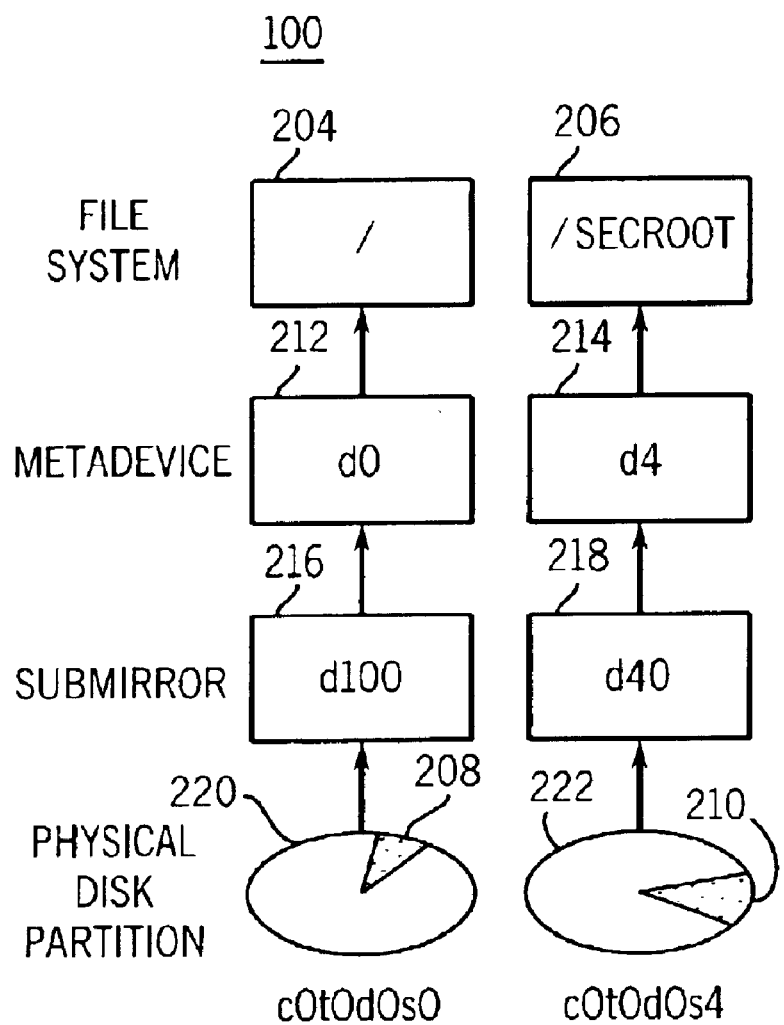
FIG. 2 is a representation of an exemplary implementation of one or more file systems, one or more disk partitions, one or more metadevices, and one or more submirrors located on the recordable data storage media of the apparatus of FIG. 1, and further illustrates a default connection.

Referring to FIG. 2, the apparatus 100 in one example comprises a default connection of file systems 204 and 206, disk partitions 208 and 210, metadevices 212 and 214, and submirrors 216 and 218. The apparatus 100 allows access to the disk partition 208 through the file system 204.

Figure 3:
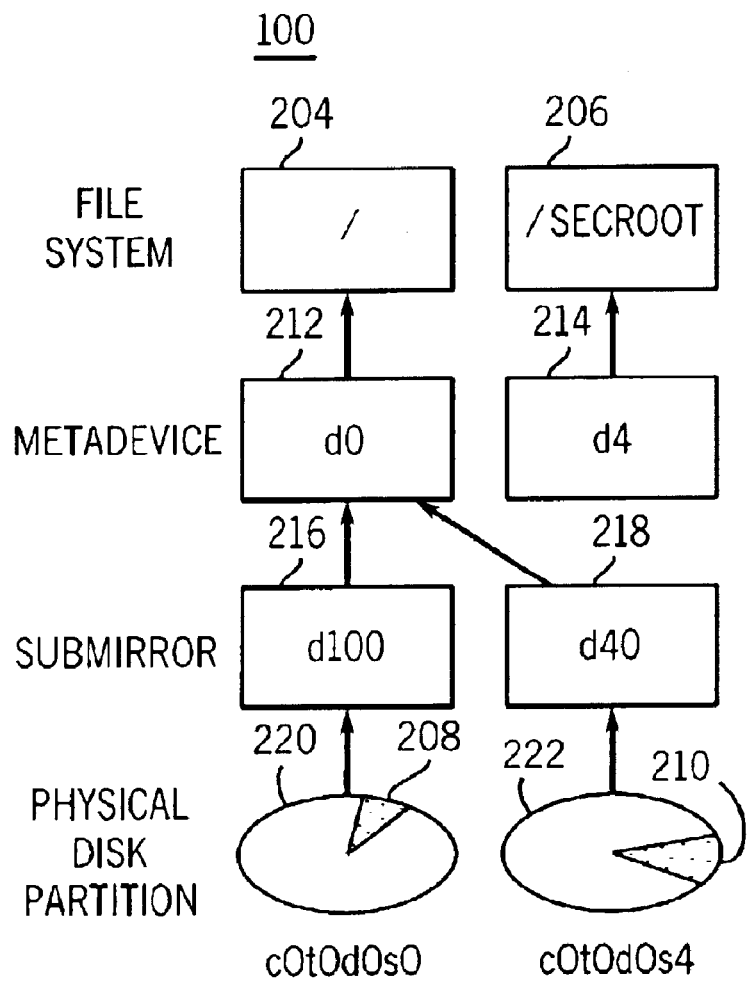
FIG. 3 is similar to FIG. 2 and further illustrates a mirroring connection.

Referring to FIG. 3, the apparatus 100 in another example comprises a mirroring connection of the file systems 204 and 206, the disk partitions 208 and 210, the metadevices 212 and 214, and the submirrors 216 and 218. The apparatus 100 allows mirroring of the contents of the disk partition 208 to the disk partition 210.

Figure 4:
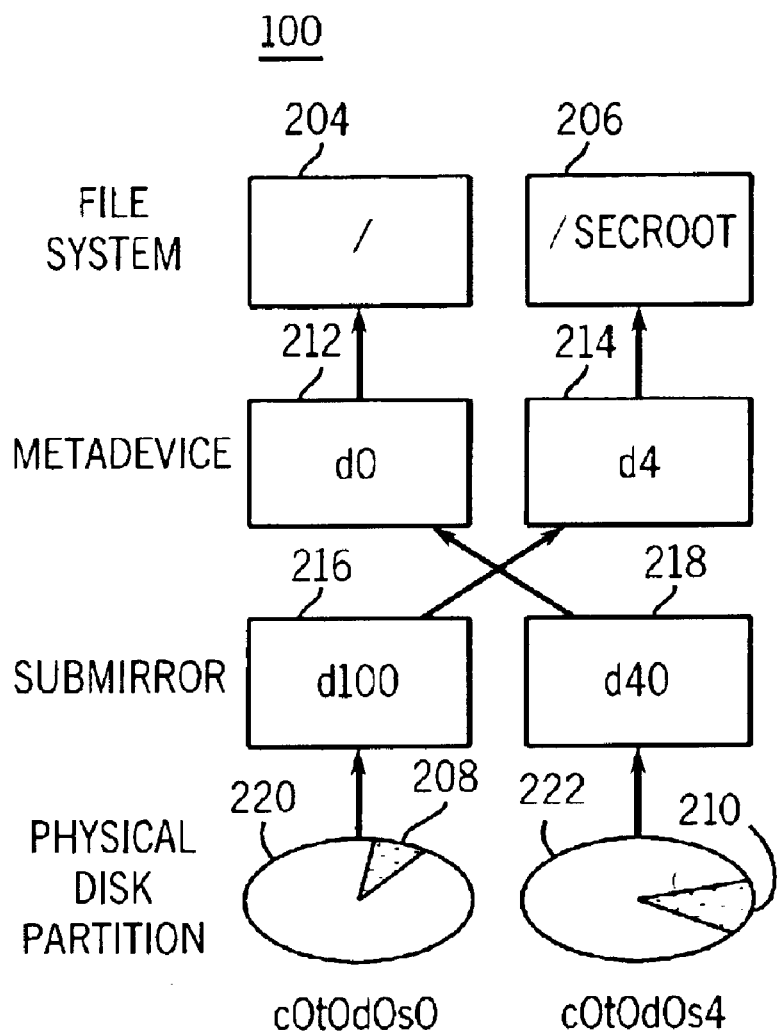
FIG. 4 is similar to FIG. 2 and further illustrates a modification and access connection.

Referring to FIG. 4, the apparatus 100 in yet another example comprises a modification and access connection of the file systems 204 and 206, the disk partitions 208 and 210, the metadevices 212 and 214, and the submirrors 216 and 218. The apparatus 100 allows a modification of a first one of the disk partitions 208 and 210 contemporaneously with access by one or more client applications to a second one of the disk partitions 208 and 210, as described herein.

Referring to FIGS. 2–4, the disk partition 208 stores one or more software application files. In one example, the one or more software application files comprise components of an operating system for a server computer. The operating system in one example comprises a Solaris™ operating system offered by Sun Microsystems, Inc. (Santa Clara, Calif. 95054, http://www.sun.com). The server computer in one example comprises a wireless base station mobility server. For example, the server computer supports Code Division Multiple Access ("CDMA") and/or Time Division Multiple Access ("TDMA") radio control software dispersed over a plurality of wireless base station mobility servers. The server computer supports wireless base station operations, administration, and maintenance.

In one example of an operating system update, the file system 204 comprises a root ("/") directory and the file system 206 comprises a secondary root ("/secroot") directory. The file system 206 in one example comprises a spare directory substantially similar to and interchangeable with the file system 204. Either of the file systems 204 and 206 may couple with either of the disk partitions 208 and 210.

Figure 6:
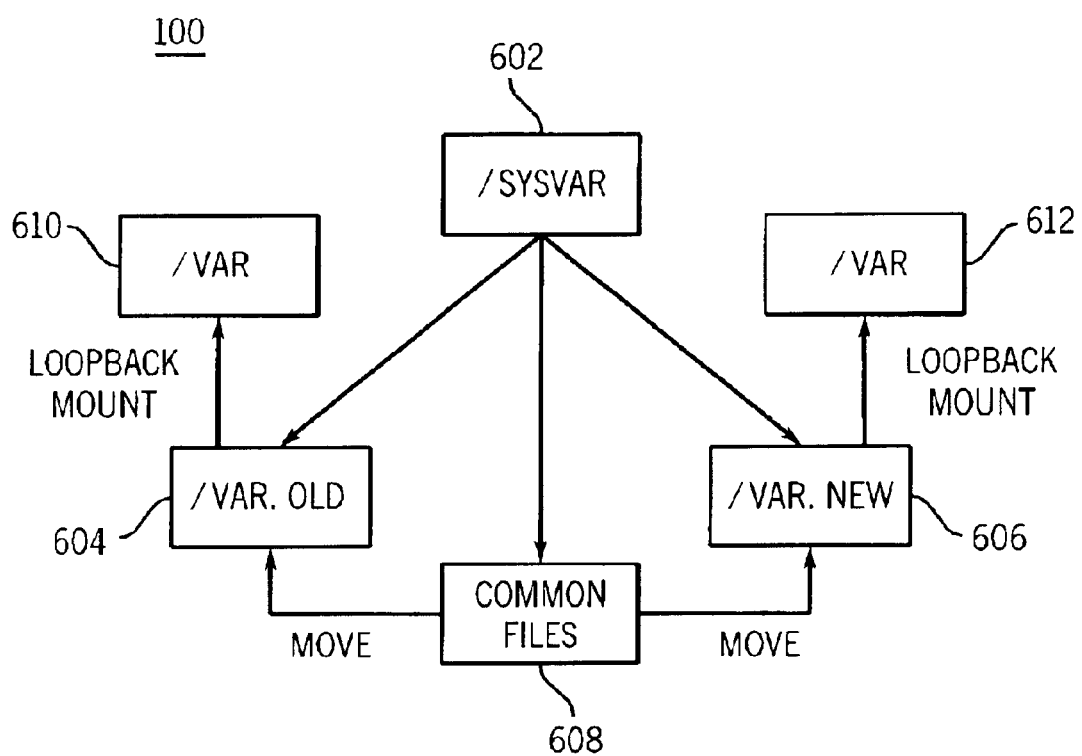
FIG. 6 is a representation of an exemplary implementation of an operating system update to supplemental system files stored in a supplemental file system located on the recordable data storage media of the apparatus of FIG. 1.

The file systems 204 and 206 comprise a user interface that provides access to the disk partitions 208 and 210. In one example, substantially all essential system files that define the operating system are found in subdirectories of the file system 204. In one exemplary application, the Flexent® Mobility Server architecture ("FMS") offered by Lucent Technologies (Murray Hill, N.J. 07974, http://www.lucent.com) assigns approximately 95% of the essential system files to be stored in the disk partition 208 under the file system 204. The remaining essential system files in one example are stored in another disk partition under a supplemental directory ("/var") (FIG. 6).

The disk partitions 208 and 210 in one example reside on hard disks 220 and 222, respectively. In one example, the hard disks 220 and 222 comprise respective independent hard disks. In another example, the hard disks 220 and 222 comprise respective portions of a single hard disk. The disk partitions 208 and 210 comprise one or more content portions. The one or more content portions of the disk partitions 208 and 210 comprise one or more data, file, and information locations. The one or more content locations of the disk partitions 208 and 210 in one example store one or more portions of the first and second operating systems 106 and 108 (FIG. 1). The disk partitions 208 and 210 in one example comprise identification names that describe one or more features of the disk partitions 208 and 210.

An exemplary identification name of the disk partition 208 is hard disk partition c0t0d0s0. The component c0 of c0t0d0s0 represents a specific controller of the hard disk 220. The component t0 of c0t0d0s0 represents a specific device with which the hard disk 220 is connected, for example, a Small Computer System Interface ("SCSI") adapter. The component d0 of c0t0d0s0 represents a specific hard disk that stores the disk partition 208. The component s0 of c0t0d0s0 represents a specific slice of the hard disk 220 that corresponds to the disk partition 208. For example, the Solaris™ operating system allows the hard disk 220 to be split into eight slices. An exemplary identification name of the disk partition 210 is hard disk partition c0t0d0s4. In other exemplary identification names of the disk partitions 208 and/or 210, the component values correspond to different specific controllers, hard disks, connection devices, and slices.

The disk partition 210 in one example excludes a disk label which in a previous design of a disk partition would have corresponded to that disk partition and been located in the first block of data. The exclusion of the disk label in one example allows mirroring of the contents of the disk partition 208 to the disk partition 210. For example, were the disk partition 210 to otherwise include the excluded disk label, then the Solaris™ operating system would prohibit mirroring of the contents of the disk partition 208 to the disk partition 210.

The metadevices 212 and 214 in one example comprise respective logical devices that represent one or more physical slices. The metadevices 212 and 214 in one example represent the physical slices by concatenation, striping, mirroring, or logging of the physical slices. In one example, the metadevices 212 and 214 map logical block addresses to respective locations on the physical slices. The metadevices 212 and 214 couple with the file systems 204 and 206, respectively.

The submirrors 216 and 218 in one example replicate data (e.g., operating system software) by maintaining multiple copies of the operating system software. A mirror in one example comprises a collection of one or more submirrors.

Upon a modification to the mirror, the modification in one example is applied to each of the one or more submirrors. The submirrors 216 and 218 couple with the disk partitions 208 and 210, respectively. For example, the submirrors 216 and 218 comprise stripes or concatenations. The Solaris™ operating system allows the metadevices 212 and 214, and the submirrors 216 and 218 to have identification names, for example, any identification name between d0 to d512. In one example, the Flexent® Mobility Server employs the identification names d0 to d7 to label metadevices and the identification names d10 to d100 to label submirrors. Either of the metadevices 212 and 214 in one example may couple with either of the submirrors 216 and 218. A mirror utility program of the Solaris™ operating system provides commands that execute attachment and detachment of the metadevices 212 and 214 with the submirrors 216 and 218. The mirror utility program allows an attachment of one of the submirrors 216 and 218 to one of the metadevices 212 and 214. The mirror utility program allows a detachment of the one of the submirrors 216 and 218 from the one of the metadevices 212 and 214. The mirror utility program allows a reattachment of the one of the submirrors 216 and 218 to a different one of the metadevices 212 and 214. The mirror utility program allows an attachment of multiple submirrors, for example, the submirrors 216 and 218 to a single metadevice, for example, the metadevice 212.

Referring to FIGS. 1–5, an illustrative description of exemplary operation of an update of an operating system of the apparatus 100 is now presented, for explanatory purposes. The apparatus 100 of FIG. 2 comprises a startup connection for the operating system update. The operating system is running from the disk partition 220 though the submirror 216 and the metadevice 212 to the file system 204. The disk partition 222, the submirror 218, the metadevice 214 and the file system 206 are spare components that are idle, unused, or used by a different application. The disk partition 208 stores the first operating system 106, for example, a Solaris™ operating system version eight. A user decides to update the first operating system to the second operation system 108, for example, a Solaris™ operating system version nine.

Exemplary process flow 502 serves to allow the apparatus 100 to update the first operating system 106 to the second operating system 108 in the server computer, as described herein. The process flow 502 employs one or more steps, for example, STEPS 504, 506, 508, 510, 512, 514, 516, 518, 520, 522, 524, 526, 528, 530, and 532. The process flow 502 in one example serves to allow the apparatus 100 to update the first operating system 106 to the second operating system 108 in the disk partition 208 contemporaneously with access to one or more subportions of the disk partition 210 by one or more client applications. After the operating system update is complete, the second operating system 108 runs from a same disk partition (e.g., disk partition 208) as the first operating system 106 did before the operating system update. It is advantageous to run the second operating system 108 from the same disk partition as the first operating system 106 did before the operating system update to allow the user to continue to access the operating system without changing to a new access procedure. The disk partition 210 services the one or more client applications contemporaneously with the operating system update in the disk partition 208. For example, the disk partition 210 services one or more telecommunication client applications for the wireless base station mobility server. The exemplary description herein is easily extendible to allow the apparatus 100 to modify any portion of the disk partition 208, disk partition 210, or any other disk portion, as will be appreciated by those skilled in the art.

To begin the operating system update, the user initiates the STEP 504 of the process flow 502. The STEP 504 involves a pre-analysis of system files involved in the operating system update. The pre-analysis is done in the software development stage to determine which of the system files need to be changed during the operating system update. Determining which of the system files need to be changed during the operating system update before the beginning the operating system update promotes a reduction in duration of the operating system update. The pre-analysis examines the first operating system 106 for any user defined or user specific configurations, personalities, or software packages. The operating system update preserves the user defined configurations, personalities, or software packages by adding the user defined configurations, personalities, or software packages to the second operating system 108. Once the pre-analysis is complete, the STEP 504 proceeds to the STEP 506.

The STEP 506 involves preparation of the system files for update and generation of update process scripts. The pre-analysis determines what update process scripts are needed and the content of the update process scripts. In one example, the update process scripts comprise startup scripts, pre-install scripts, and post-install scripts. The update process scripts execute at various stages of the operating system update, as described herein. Once the preparation and generation of update process scripts is complete, then the STEP 506 is ready to proceed to the STEP 508. However, after the STEP 506 is complete the STEP 508 will proceed at a user determined time. The STEP 508 may proceed immediately after the STEP 506 or the user may schedule the STEP 508 to proceed at any later time. For example, the user could schedule the STEP 508 to proceed during a time of reduced traffic in the server computer.

The STEP 508 involves planting a new startup script to execute after a reboot. The new startup script comprises one or more files written to a subdirectory of the file system 204. The pre-analysis and preparation of the STEPS 504 and 506 generate the new startup script. Once the new startup script is planted in the subdirectory of the file system 204, the STEP 508 proceeds to the STEP 510.

The STEP 510 involves mirroring the first operating system 106 located in the disk partition 208 to the disk partition 210. For example, the first operating system 106 is mirrored to the disk partition 210. In one example, referring to FIG. 3, the submirror 218 first detaches from the metadevice 214 and second, attaches to the metadevice 212. Both the disk partition 208 and the disk partition 210 attach to the metadevice 212. Upon attachment of the disk partition 208 and the disk partition 210 to a same metadevice, for example metadevice 212, data from the disk partition 208 is automatically copied to the disk partition 210 until both the disk partition 208 and the disk partition 210 contain identical information. The mirroring overwrites any previously-existing data in the disk partition 210. In another example, the submirror 218 begins the operating system update free of connection to any metadevice. Detachment of the submirror 218 from the metadevice 214 is unnecessary. Therefore, the submirror is free to attach to the metadevice 212. Once the first operating system 106 has been mirrored to the disk partition 210, the STEP 510 proceeds to the STEP 512.

The STEP 512 involves configuring the submirror 216 to allow the disk partition 208 to be accessible by a file system other than the file system 204, for example, the file system 206. First, the submirror 216 detaches from the metadevice 212. Second, referring to FIG. 4, the submirror 216 attaches to the metadevice 214. The disk partition 210 is accessible by the file system 204 and the mirrored copy of the first operating system 106 begins to support the client applications. The file system 204 remains the user interface for output/input from/to the server computer. The server computer in one example does not require the user to change a user interface procedure to accommodate the operating system update. The disk partition 210 supports the client applications to allow contemporaneous modification to the disk partition 208. Once the submirror 216 detaches from the metadevice 212, the STEP 512 proceeds to the STEP 514.

The STEP 514 involves execution of the pre-install scripts. The pre-analysis and preparation of the STEPS 504 and 506 generate the pre-install scripts in accordance with results of the pre-analysis. The pre-install scripts are specific to an individual process. The pre-install scripts may preserve one or more files before progressing further in the operating system update. Once execution of the pre-install scripts is complete, the STEP 514 proceeds to the STEP 516.

The STEP 516 involves an update of the first operating system 106 to the second operating system 108 in the disk partition 208. The pre-analysis in the STEP 504 determines one or more of the system files that require modification during the operating system update. During the STEP 516 the file system 206 provides access and modification to the one or more of the system files in the disk partition 208. Once modification of the one or more of the system files is complete, the STEP 516 proceeds to the STEP 518.

Figure 5:
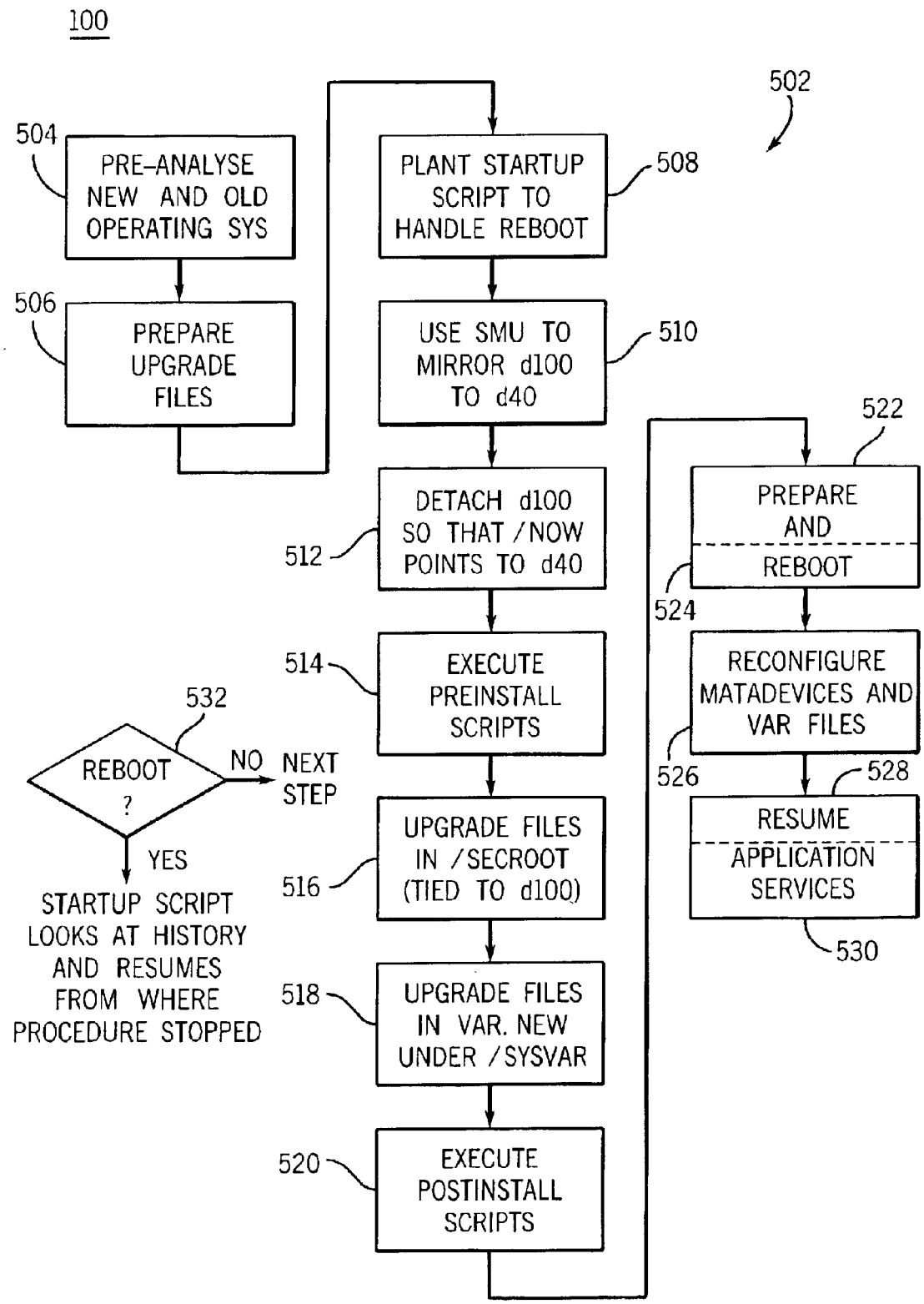
FIG. 5 is a representation of an exemplary process flow for an update of an operating system located on the recordable data storage media of the apparatus of FIG. 1.

Referring to FIGS. 1 and 5–6, the STEP 518 involves an update to a first portion of supplemental system files stored in a supplemental file system ("/sysvar") 602. The pre-analysis in the STEP 504 determines the first portion of the supplemental system files that are different between the first and second operating systems 106 and 108 and a second portion of the supplemental system files that are common to the first and second operating systems 106 and 108. The supplemental file system 602 comprises a first operating system subdirectory ("/var.old") 604, a second operating system subdirectory ("/var.new") 606, and a shared subdirectory ("common files") 608. The first operating system subdirectory 604 comprises the supplemental system files for the first operating system 106. For example, the first operating system subdirectory 604 comprises the supplemental system files specific to the first operating system 106. The second operating system subdirectory 606 comprises the supplemental system files for the second operating system 108. For example, the second operating system subdirectory 606 comprises the supplemental system files specific to the second operating system 108. The second portion of the supplemental system files resides in the shared subdirectory 608. For example, the shared subdirectory 608 comprises the supplemental system files common to the first and second operating systems 106 and 108.

Either of the first and second operating systems 106 and 108 in one example may employ the supplemental system files of the shared subdirectory 608. Before the operating system update is complete, the first operating system 106 in one example employs the supplemental system files of the first operating system subdirectory 604 and the shared subdirectory 608. The supplemental system files of the first operating system subdirectory 604 and the shared subdirectory 608 link or loopback mount to a file system ("/var") 610. After the operating system update is complete the second operating system 108 employs the supplemental system files of the second operating system subdirectory 606 and the shared subdirectory 608. The supplemental system files of the second operating system subdirectory 606 and the shared subdirectory 608 link or loopback mount to a file system 612 ("/var"). Once supplemental file system 602 has been configured, the STEP 518 proceeds to the STEP 520.

Referring to FIGS. 1–5, the STEP 520 involves execution of the post-install scripts. The pre-analysis and preparation of the STEPS 504 and 506 generate the post-install scripts in accordance with results of the pre-analysis. The post-install scripts are specific to an individual process. Once execution of the post-install scripts is complete, the STEP 520 is ready to proceed to the STEP 522. However, after the STEP 520 is complete the STEP 522 will proceed at a user determined time. The STEP 522 may proceed immediately after the STEP 520 or the user may schedule the STEP 522 to proceed at any later time. For example, the user could schedule the STEP 522 to proceed during a time of reduced traffic in the server computer.

The STEP 522 involves preparation for a reboot of the server computer. For example, before rebooting the server computer generates a new startup script. The new startup script comprises procedures for reconfiguration and syncing of the file systems 204 and 206, the disk partitions 208 and 210, the metadevices 212 and 214, and the submirrors 216 and 218. Once the supplemental file system 602 has been configured, the STEP 522 proceeds to the STEP 524. The STEP 522 involves the reboot of the server computer. Upon restart, the STEP 524 proceeds to the STEP 526.

The STEP 526 involves execution of the new startup script. Referring to FIG. 2, the new startup script comprises procedures for reconfiguration of the submirrors 216 and 218 to the default connection implementation. At reboot of the server computer at STEP 524, referring to FIG. 4, the submirrors 216 and 218 were connected to the metadevices 212 and 214. If the server computer restarts with the submirrors 216 and 218 and the metadevices 212 and 214 connected as the apparatus 100 of FIG. 4, then the server computer in one example will run the first operation system from disk partition 210 rather than the second operating system 108 from disk partition 208. To run the second operating system 108: the connection between the submirror 216 and the metadevice 214 is severed; the connection between the submirror 218 and the metadevice 212 is severed; the submirror 216 is connected to the metadevice 212; and the submirror 218 is connected to the metadevice 214. After the submirrors 216 and 218 reconfigure to the default connection implementation, referring to FIG. 2, the file system 204 is coupled to the disk partition 208. Once the submirrors 216 and 218 reconfigure to the default connection implementation, the STEP 526 proceeds to the STEP 528.

The STEP 528 involves a restart of active operation of the server computer. In one example, during the operating system update the server computer is down and not processing client applications for around three to ten minutes. Once restart of active operation is completed, the server computer is able to process client applications and the STEP 528 proceeds to the STEP 530. The STEP 530 involves resuming the processing client application services by the server computer.

The STEP 532 involves protecting the progress of the operating system update in case of a power loss or reboot in the server computer. The STEP 532 is periodically executed during the operating system update. If a reboot is not detected, then the server computer continues to a next step in the operating system update. If a reboot is detected and the server computer was engaged in the operating system update, then upon restart the STEP 532 involves referencing the startup script to find the next step in the operating system update. The startup script records the progress of the operating system update until reboot or completion. Once the server computer restarts after the reboot, the operating system update restarts at the next step in the operating system update.

The exemplary description herein in one example is applicable to an update of substantially all of the system files of the operating system (e.g., the operating system update) or a portion of the system files of the operating system (e.g., an operating system patch). The operating system patch involves targeting for replacement one or more of the system files of the operating system stored in the disk partition 208, similar to the STEP 516. For each exemplary implementation of the operating system patch the one or more of the system files targeted may be different. Therefore, for each exemplary implementation the user generates a database comprising indications of the one or more of the system files targeted for replacement.

After the server computer completes the operating system update and the second operating system 108 is running from the disk partition 208, the user may decide to begin running the first operating system 106. In one example, the user may switch from the second operating system 108 back to the first operating system 106 at any time subsequent to completion of the operating system update. In another example, the user may switch from the second operating system 108 back to the first operating system 106 during a predetermined grace period. In yet another example, the user may switch from the second operating system 108 back to the first operating system 106 prior to execution of a predefined command, for example, a command that commits to the second operating system 108. To switch from the second operating system 108 back to the first operating system 106 the server computer reactivates the first operating system 106 stored in the disk partition 210 and the first operating system subdirectory 604 (FIG. 6).

The apparatus 100 in one example employs one or more computer-readable signal-bearing media. One example of a computer-readable signal-bearing medium for the apparatus 100 comprises an instance of the recordable data storage medium 102 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
    mirroring a first content portion of a first disk partition to a second content portion of a second disk partition; and
    modifying a first one of the first content portion and the second content portion contemporaneously with access by one or more client applications to one or more subportions of a second one of the first content portion and the second content portion;
    wherein the step of modifying the first one of the first content portion and the second content portion contemporaneously with access by the one or more client applications to the one or more subportions of the second one of the first content portion and the second content portion comprises the steps of:
    detaching a submirror associated with the first disk partition from a first metadevice associated with a primary file system;
    attaching the submirror to a second metadevice associated with a secondary file system; and
    employing the secondary file system to modify the first content portion of the first disk partition.

2. The method of claim 1, wherein the submirror comprises a first. submirror associated with the first disk partition, wherein the step of mirroring the first content portion of the first disk partition to the second content portion of the second disk partition comprises the steps of:
    detaching a second submirror associated with the second disk partition from the second metadevice; and
    attaching the second submirror to the first metadevice associated with the first disk partition.

3. The method of claim 1, wherein a server computer comprises the submirror and the first metadevice, the method further comprising the step of:
    running a startup script after a reboot of the server computer to reconfigure a connection path between the submirror and the first metadevice.

4. The method of claim 1, wherein the step of employing the secondary file system to modify the first content portion of the first disk partition comprises the step of:
    accessing the first disk partition through a connection path that comprises the secondary file system, the second metadevice, and the submirror.

5. The method of claim 1, wherein the submirror comprises a first submirror associated with time first disk partition, wherein the step of modifying the first one of the first content portion and the second content portion contemporaneously with access by the one or more client applications to the one or more subportions of the second one of the first content portion and the second content portion comprises the steps of:
    attaching the second submirror associated with the second disk partition to the first metadevice associated with the primary file system;
    detaching the first submirror or associated with the first disk partition from the metadevice associated with the primary file system; and
    employing the second disk partition to support one or more of the one or more client applications through the primary file system.

6. The method of claim 1, wherein the step of modifying the first one of the first content portion and the second content portion contemporaneously with access by the one or more client applications to the one or more subportions of the second one of the first content portion and the second content portion comprises the steps of:

modifying one or more operating system files stored in the first disk partition; and actively operating one or more operating system files stored in the second disk partition;

wherein the one or more operating system files stored in the second disk partition comprise mirrored copies of the one or more operating system files stored in the first disk partition;

wherein the step of modifying the one or more operating system files stored in the first disk partition and the step of actively operating one or more operating system files stored in the second disk partition are contemporaneous.

7. The method of claim 1, wherein a first operating system is stored in the first disk partition, wherein a mirrored copy of the first operating system is stored in the second disk partition, wherein the step of modifying the first one of the first content portion and the second content portion contemporaneously with access by the one or more client applications to the one or more subportions of the second one of the first content portion and the second content portion comprises the steps of:

updating the first operating system stored in the first disk partition to a second operating system; and actively operating the mirrored copy of the first operating system stored in the second disk partition;

wherein the step of updating the first operating system stored in the first disk partition to the second operating system and the step of actively operating the mirrored copy of the first operating system stored in the second disk partition are contemporaneous.

8. The method of claim 7, wherein the step of updating the first operating system stored in the first disk partition to the second operating system comprises the steps of:

deleting from the first disk partition a file that is used by the first operating system and unused by the second operating system;

adding to the first disk partition a file that is used by the second operating system and unused by the first operating system; and maintaining in the first disk partition a file that is used by both of the first operating system and the second operating system.

9. The method of claim 8, further comprising the step of:

adding one or more user specific software packages from the first operating system to the second operating system.

10. The method of claim 1, wherein the first content portion comprises one or more first files of an operating system, wherein a third content portion comprises one or more second files of the operating system, the method further comprising the steps of:

updating one or more outdated files of the one or more second files to one or more updated files contemporaneously with active performance of the operating system;

storing in a first subdirectory of the third content portion the one or more old files; and storing in a second subdirectory of the third content portion the one or more updated files.

11. The method of claim 10, wherein the operating system comprises a first operating system, wherein the step of updating the one or more old files of the one or more second files to the one or more updated files contemporaneously with active performance of the operating system comprises the steps of:

comparing the first operating system with a second operating system that comprises the one or more updated files; and determining one or more files that are common to the first operating system and the second operating system.

12. The method of claim 11, further comprising the steps of:

storing in a third subdirectory of the third content portion the one or more files that are common to the first operating system and the second operating system; and accessing the one or more files of the third subdirectory through employment of any of the first and second subdirectories.

13. The method of claim 10, further comprising the step of:

loopback mounting any one of the first subdirectory and the second subdirectory as a primary directory of the third content portion used by the operating system.

14. The method of claim 1, further comprising the steps of:

coupling the first disk partition with either the primary file system through the first metadevice or the secondary file system through the second metadevice; and coupling the second disk partition with either the secondary file system through the second metadevice or the primary file system through the first metadevice.

15. The method of claim 1, wherein the step of modifying the first one of the first content portion and the second content portion results in a modification of one of the first content portion and the second content portion, the method further comprising the steps of:

recording in a startup script a progress of the modification; and employing the startup script to resume the modification at a point in the progress upon an interruption in the modification.

16. An apparatus, comprising:

a first disk partition that stores contents of a primary file system;

a second disk partition that is able to store the contents of the primary file system;

a first submirror that is associated with the first disk partition and a first metadevice, wherein the first metadevice is associated with the primary file system; and a second submirror that is associated with the second disk partition and a second metadevice, wherein the second metadevice is associated with a secondary file system;

wherein a detachment of the second submirror from the second metadevice and an attachment of the second submirror with the first metadevice serves to transfer a mirrored copy of the contents of the primary file system to the second disk partition;

wherein a detachment of the first submirror from the first metadevice and an attachment of the first submirror with the second metadevice serve to facilitate modification of the contents of the primary file system through the second metadevice contemporaneously with access to the contents of the primary file system through the first metadevice.

17. The apparatus of claim 16, wherein the modification of the contents of the primary file system comprises an operating system update.

18. The apparatus of claim 16, wherein a partitioning of the second disk partition results in an exclusion of a disk label, wherein the exclusion of the disk label serves to allow the contents of the primary file system of the first disk partition to be mirrored to the second disk partition.

19. An article, comprising:

one or more computer-readable signal-bearing media; and means in the one or more media for mirroring a first content portion of a first disk partition to a second content portion of a second disk partition; and means in the one or more media for modifying a first one of the first content portion and the second content portion contemporaneously with access by one or more client applications to one or more subportions of a second one of the first content portion and the second content portion;

wherein the means in the one or more media for modifying comprises;

means in the one or more media for detaching a submirror associated with the first disk partition from a first metadevice associated with a primary file system;

means in the one or more media for attaching the submirror to a second metadevice associated with a secondary file system; and means in the one or more media for employing the secondary file system to modify the first content portion of the first disk partition.

* * * * *